(12) United States Patent
Dahmen

(10) Patent No.: US 6,244,162 B1
(45) Date of Patent: Jun. 12, 2001

(54) SPRAY HEAD FOR COFFEE BREWER

(75) Inventor: William A. Dahmen, Goshen, KY (US)

(73) Assignee: Grindmaster Corporation, Louisville, KY (US)

( * ) Notice: Subject to any disclaimer, the term of this patent is extended or adjusted under 35 U.S.C. 154(b) by 0 days.

(21) Appl. No.: 09/490,474

(22) Filed: Jan. 24, 2000

(51) Int. Cl.[7] ................................................. A47J 31/00
(52) U.S. Cl. .......................... 99/315; 99/304; 99/299; 426/433
(58) Field of Search ........................... 99/315, 314, 299, 99/304, 305, 306, 307; 426/433

(56) References Cited

U.S. PATENT DOCUMENTS 4,138,936 * 2/1979 Williams .................................. 99/282
5,477,775 * 12/1995 Delhom et al. ........................ 99/299
5,910,205 * 6/1999 Patel ....................................... 99/315

* cited by examiner

Primary Examiner—Reginald L. Alexander
(74) Attorney, Agent, or Firm—Vance A. Smith; Stites & Harbison

(57) ABSTRACT

A brewing apparatus with a brew basket for holding ingredients in particulate form that contain soluble flavorants delivers a predetermined amount of hot water to a spray head positioned above said brew basket. The spray head has a multiplicity of openings positioned and configured in such a manner that the hot water is sprayed uniformly over the entire surface of the ingredients at a predetermined rate thereby wetting substantially all of the particles of the ingredients and uniformly extracting said solubles.

9 Claims, 8 Drawing Sheets

SPRAY HEAD FOR COFFEE BREWER

BACKGROUND OF THE INVENTION

The present invention pertains to an apparatus for providing more efficient extraction of solubles from ground coffee in a drip filtration brewer.

In a drip filtration system for brewing coffee, the ground coffee is placed into a container such as a brew basket holding a filter and hot water is passed through the brew basket, extracting flavoring solubles from the coffee grounds in a single pass into a decanter positioned below. Because a major and consistent goal of a commercially acceptable coffee brewer is to provide a consistently good tasting cup of coffee, manufacturers continuously strive to further develop brewing equipment that addresses the discriminating tastes of the consumers. While there are many factors that contribute to the make up of a good tasting brew, it has long been recognized that the major contributors to the make up of this good taste are the concentration of the flavoring solubles in the brew and the percentage yield of solubles gained during the extraction process. Too high of a concentration of flavoring solubles is perceived as being strong coffee while too small of a concentration tastes weak to the consumer. An inefficient extraction may result in a coffee brew considered to taste strange such as grassy or peanut-like while over-extraction results in a bitter brew. There are various types of solubles that provide flavoring to the resulting beverage and they are extracted at different rates. That is, certain solubles come out of solution readily from the grounds when contacted by the hot water while others require additional contact time. Additionally, certain chemical reactions are promoted when the hot water is passing through the grounds and can continue after the brew has been made under certain circumstances such as when the brew is maintained at or above certain temperatures. The bitter taste that is often objected to by consumers may be due to over-extraction and/or over-cooking of the coffee once made. The graph of FIG. 10 illustrates this alteration of taste at various concentration and extraction percentages. Thus, there is a desired balance of these percentages that provide a coffee brew which is perceived as having an optimum taste as shown by the areas of the graph depicted by the character numeral 100. On one side of area 100, the coffee flavor is considered "underdeveloped" while on the other side the coffee flavor is said to be "overdeveloped". Above the area 100, signifying a high level of concentration, the coffee is said to be "too strong" and below is considered "too weak".

Applicant, after careful examination of the brewers of the prior art, has determined that such brewers tend to provide an inconsistent extraction of coffee solubles, often leading to the undesired "under developed" taste. Some of the ground coffee positioned in the brew basket is over extracted while the remainder is likely to be under extracted. As will be discussed below, this over and under extraction result can be demonstrated by permitting the grounds to dry following the pass-through of the hot water. The dried grounds show a visible and distinct variation from a lighter to darker color from the center to the periphery regions which indicates that a greater extraction of the solubles occurs at the center than at the outer regions. Applicant has postulated that during brewing the inner portion of the basket is showered with hot water and that some of the grounds in the outer ring float in hot water and are not extracted. Realizing the importance of this finding, applicant set out to construct a brewer in which the extraction was consistent through out the brew basket during the brewing process.

SUMMARY OF THE INVENTION

A brewing apparatus incorporating a spray head of the present invention has a brew basket for holding ingredients in particulate form that contain soluble flavorants, a heating tank for heating and holding water, and a hot water delivery system for delivering hot water from said the tank to the brew basket. The spray head is positioned above the brew basket and has a multiplicity of openings in a bottom plate thereof, positioned and configured in such a manner that the hot water is sprayed uniformly over the entire surface of the ingredients at a predetermined rate. This uniform spray wets substantially all of the particles of the ingredients and the water then passes through uniformly providing a consistent extraction rate over the entire mass of ingredients. The openings may comprise two arrays of openings. The first array may have a circular configuration and be positioned in a circle above the central region of the brew basket. The second array may have a D-shaped configuration and be positioned in a larger circle over the peripheral region of the brew basket and canted with respect to the first array, such that that the spray of hot water diverges in a flat pattern uniformly, but at the same volume rate, over the ingredients in the peripheral region.

DETAILED DESCRIPTION OF THE PREFERRED EMBODIMENT

Figure 1:
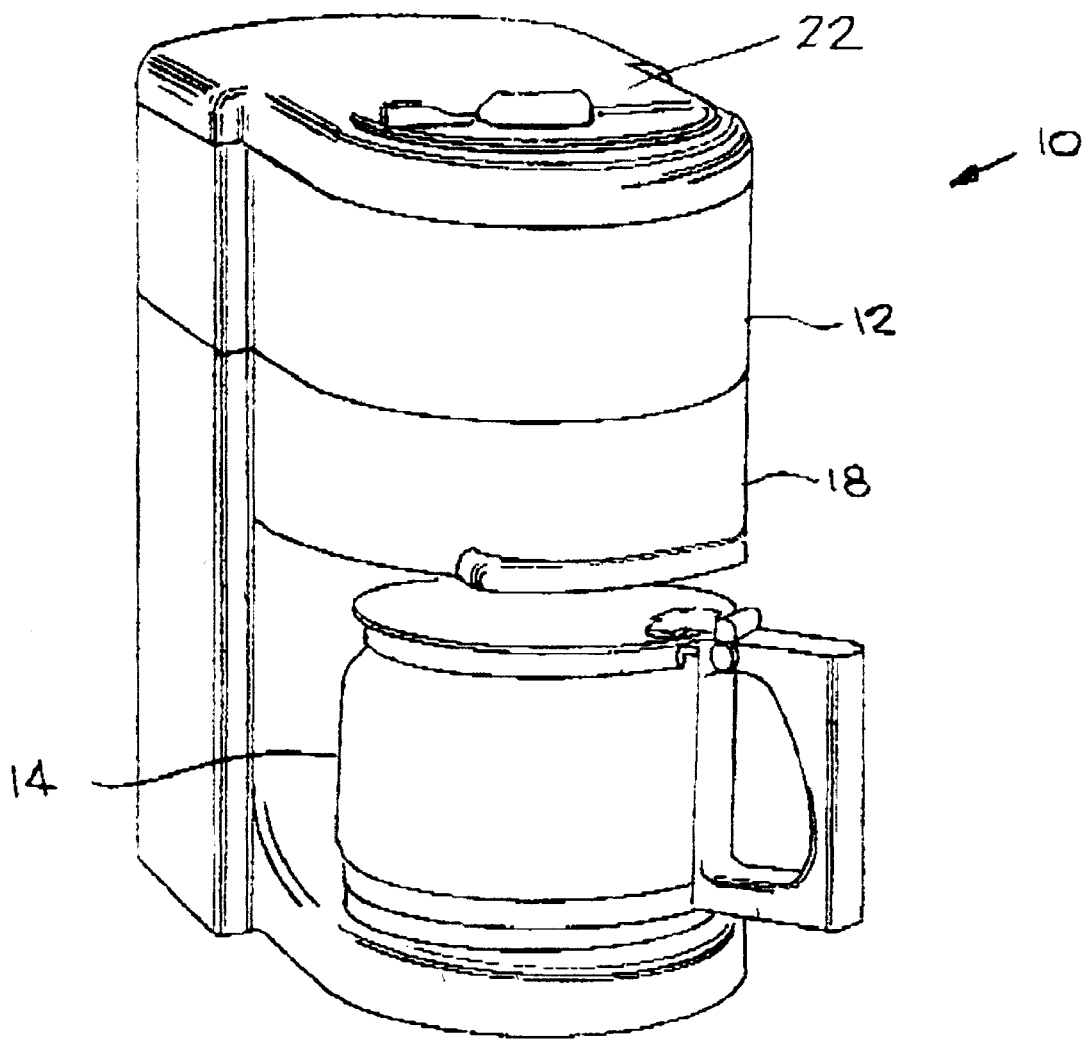
FIG. 1 is a side perspective of a gravity flow displacement type of coffee brewer which may incorporate a spray head in accordance with the present invention.
Figure 2:
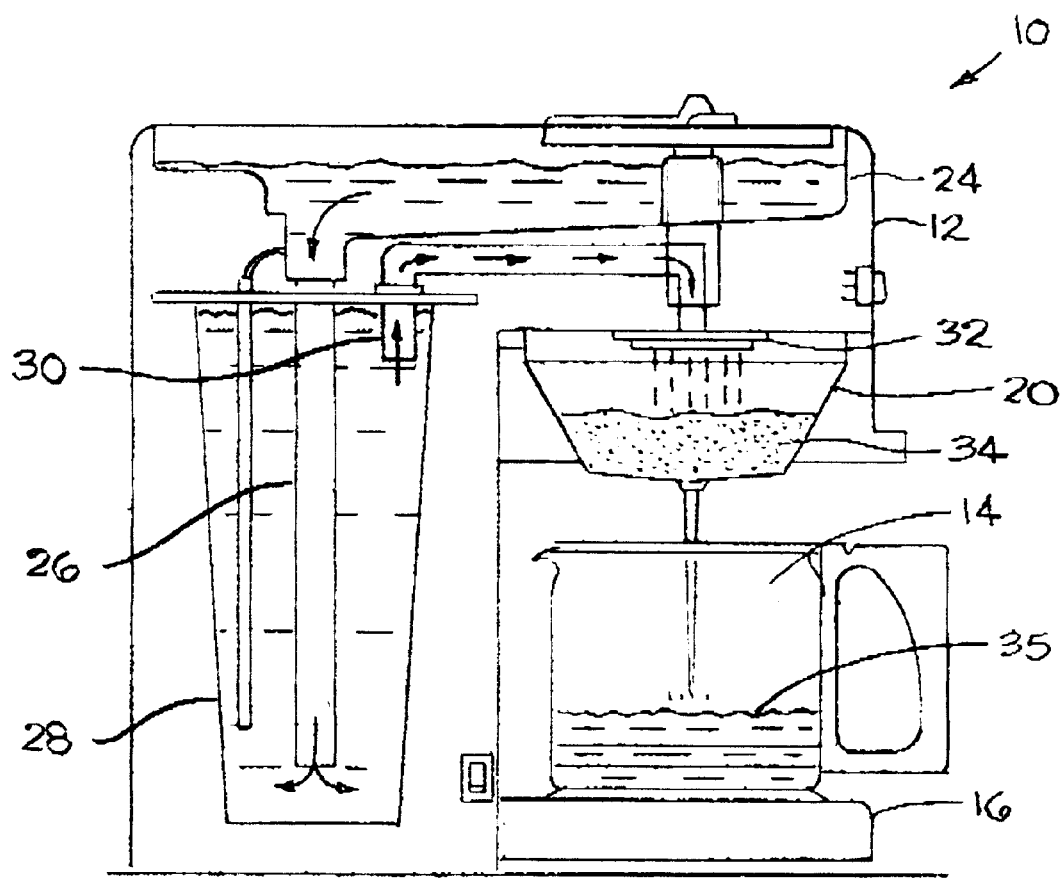
FIG. 2 is a schematic in side view of the brewer of FIG. 1 depicting the various internal components of the brewer including the spray head.

FIGS. 1 and 2 depict a brewing system, generally characterized by reference numeral 10, that is a gravity-flow displacement type in which a supply of cold water is introduced into the system through the top thereof and displaces an equal volume of hot water which is used to make the hot beverage. Such a system is described in more detail in commonly assigned and co-pending U.S. patent application Ser. No. 09/368,196 filed Aug. 4, 1999. The system comprises generally the brewer assembly 12 and a decanter 14 positioned on a hot plate member 16. The underside of the brewer assembly 12 is provided with a set of flanges (not shown) over which the brew basket 20 is inserted for receiving the hot water at the commencement of a brewing cycle. The cold water flows by gravity from the top receptacle 24 through a tube or a "stand pipe" 26 downwardly into the bottom of a heating tank 28 containing heated water. The heated water is upwardly displaced by the cold water through a tube 30 flowing under pressure to spray head 32 where the heated water is sprayed over the ground coffee 34 positioned in the filter basket 20. The solubles in the ground coffee 34 are then extracted by the hot water which then flows as beverage 35 into the decanter 14 on hot plate 16.

Figure 3:
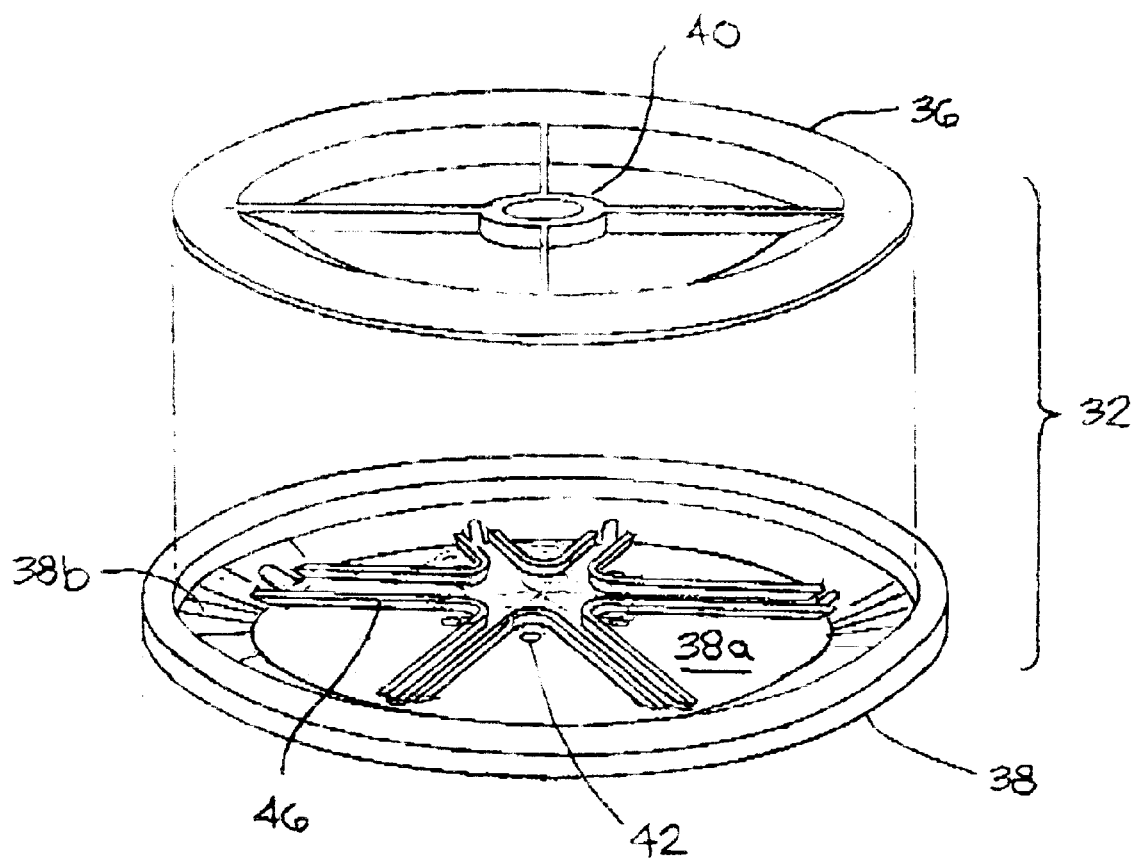
FIG. 3 is an exploded perspective of a spray head in accordance with the present invention.
Figure 4:
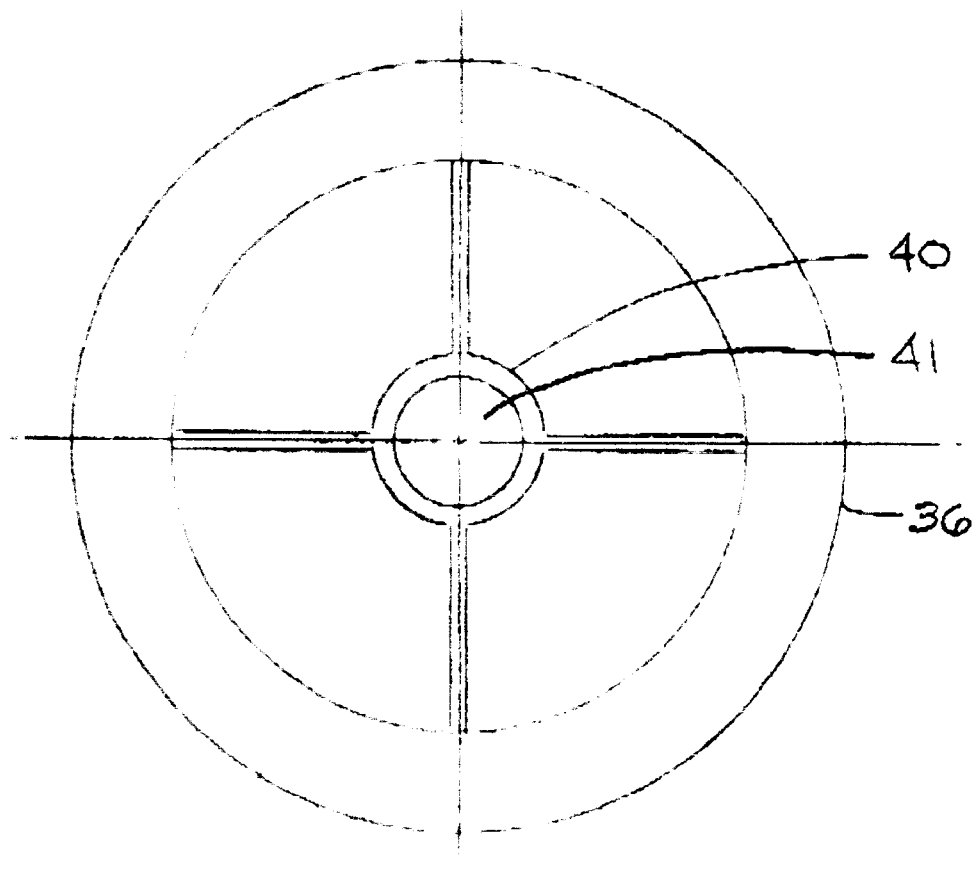
FIG. 4 is a top view of the top plate of the spray head of the present invention.
Figure 5:
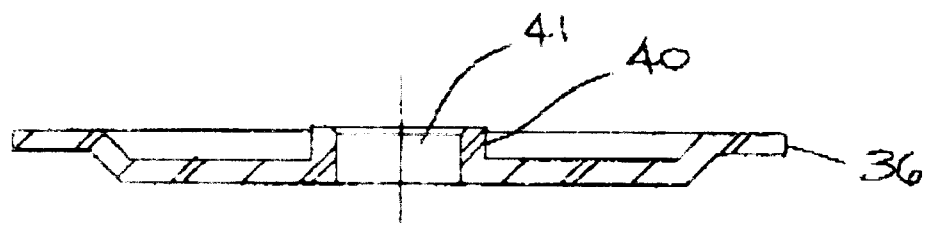
FIG. 5 is a side section view of the top plate of FIG. 4.
Figure 6:
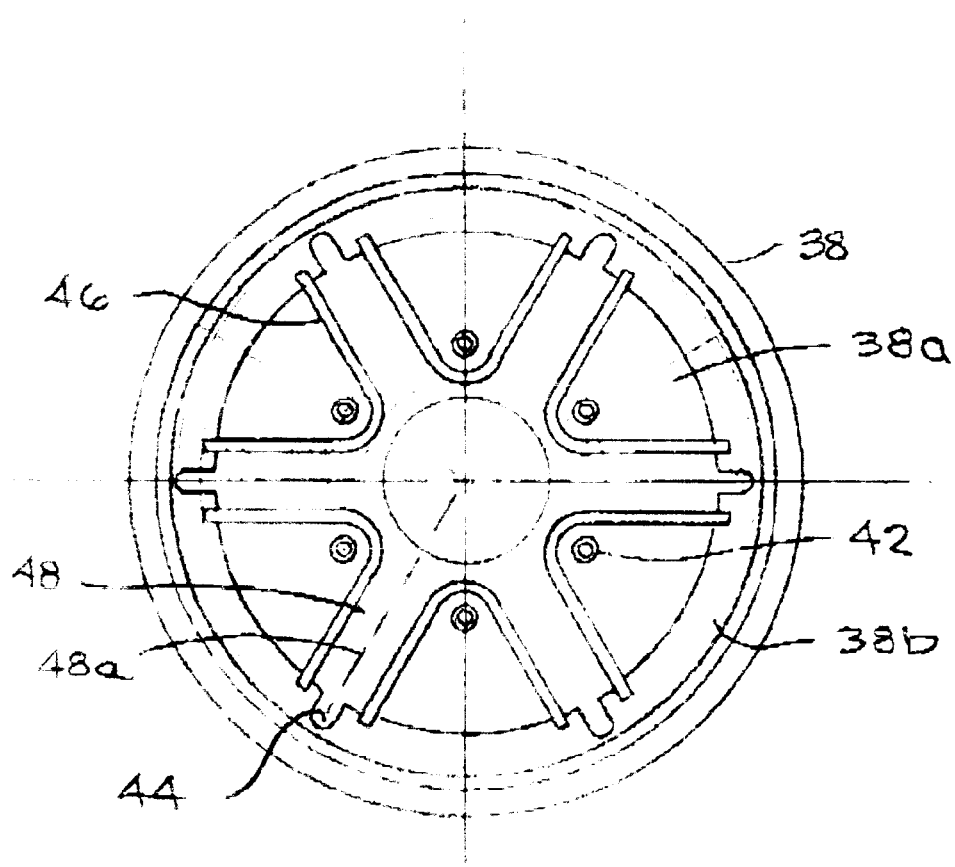
FIG. 6 is a top view of the bottom plate of the spray head of the present invention.
Figure 7:
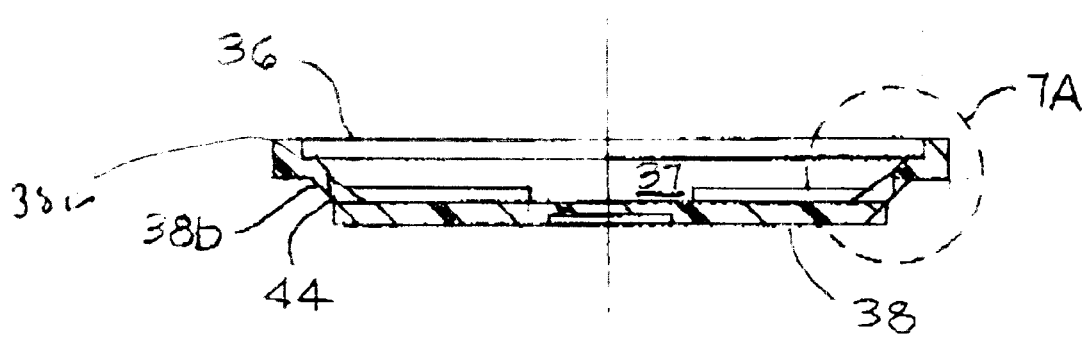
FIG. 7 is a side sectional view of the bottom plate of FIG. 6.
Figure 7A:
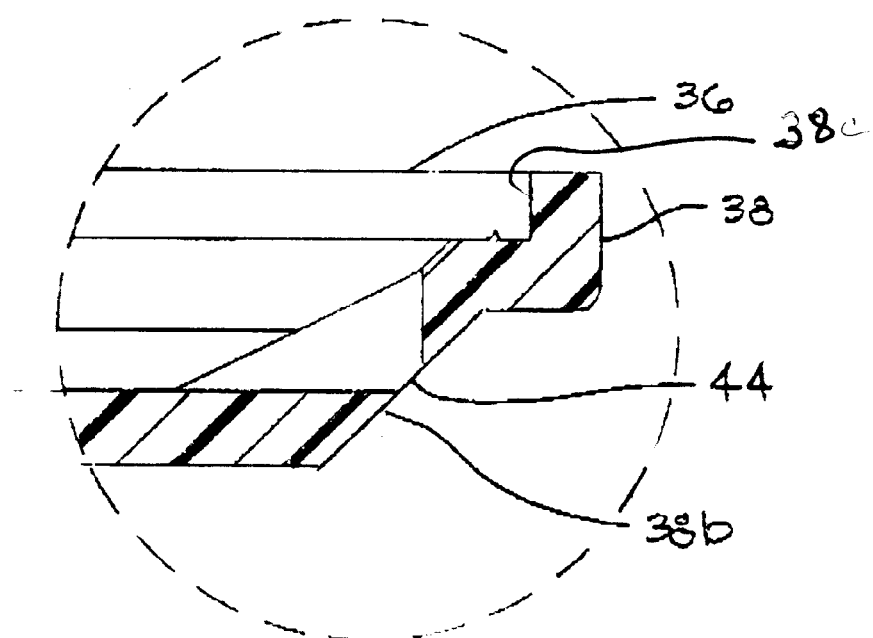
FIG. 7A is an enlarged sectional view of the perimeter of the bottom plate of FIG. 7, showing the D-shaped opening and the fitting of the bottom plate to the top plate.
Figure 8:
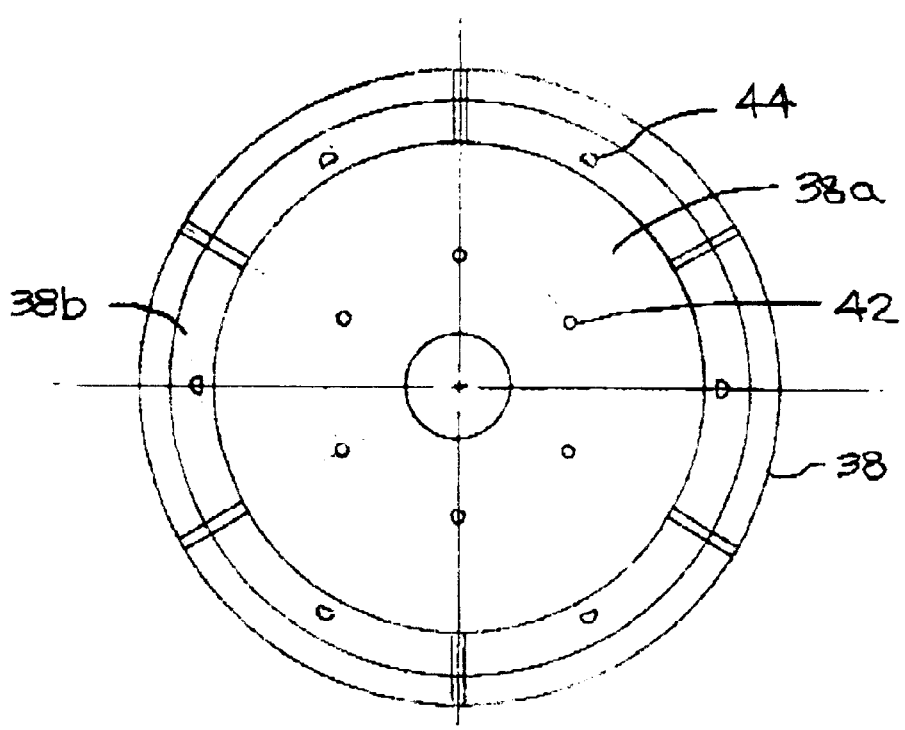
FIG. 8 is a bottom view of the bottom plate depicting the various openings therein.

From the exploded perspective of FIG. 3, it can be seen that spray head 32 is defined by a pair of plates, top plate 36 and bottom plate 38, that press fit together about the peripheries thereof forming a water tight seal and an internal cavity 37 (best seen in FIG. 7). Top plate 36 is provided with an annular boss 40 adapted to fit in a water tight relationship about the tube 30 as may be seen in FIGS. 3, 4, and 5. The opening 41 formed by boss 40 in the plate 36 permits the cold water to enter the internal cavity 37. The lower plate 38, illustrated in FIGS. 3, 6–8, has a flat central region 38a positioned substantially horizontally with a first array of substantially circular holes 42 therein arranged in a circular pattern about the central axis of plate 38. A peripheral region 38b of plate 38 is upwardly inclined at an angle of about 45° to region 38a and has a second array of D-shaped openings 44 arranged in a circular pattern about the central axis of plate 38. The first array of holes 42 and second array of openings 44 have an arc offset of about 30°. The inclined angle and shape of openings collectively with the arc offset of the holes and openings functions to provide a uniform delivery of hot water over the entire surface of the ground coffee positioned in the filter basket 22. The bottom plate 38 is also provided with a circumferential extending lip 38c that is adapted to receive the top plate 36 in a snap fit water tight manner as best seen in FIGS. 7 and 7A.

Both arrays of openings/holes 42,44 have preferred diameters of about 1.58 mm. The second array of openings 44, of course, has a portion of its periphery that is flattened to form the vertical part of the D shape. The primary function of the D-shape is described below.

FIGS. 3 and 6 best depict a plurality of walls 46 having a configuration that define a group of channels 48 having an axis 48a extending outwardly along radial lines between the openings 42 toward the openings 44. Each channel 48 terminates at the boundary of the central region 38a with the inclined peripheral region 38b adjacent an associated opening 44. The height of the walls 46 does not reach the bottom of top plate 36, thus forming small gaps there between. When water flows into the internal cavity 37, it is initially directed along channels 48 to the openings 44. Because the amount of water entering the cavity water exceeds the ability of openings 44 to distribute the water, the water quickly flows over the walls 46 and to openings 42. A primary function of the channels is to ensure the water emerges from the openings 44 as a stream that reaches and wets the grounds ringing the outer periphery of the brew basket. In a typical domestic brewer of this type it is desired that about 48 ounces of water is delivered and extracted through the ground coffee in about 3.5 minutes. Unless the channels are present, it becomes extremely difficult to accomplish this in the time allotted while providing uniform extraction.

The inclination of the peripheral region and the shape of the openings 44 permit a dispersion of water over the entire outer region of the brew basket and coffee grounds therein. The pressure of the water (as assisted by the channels 48) coupled with the inclination and the D-shape of the openings 44 causes the water to spray out in a dispersed pattern similar to that which occurs when one places a thumb partially across the open end of a hose so that the water is sprayed out in a flat but diverging pattern. The pattern spray is an important function of the shape of the openings and inclination because it permits the hot water to reach essentially the entire surface of the grounds in the periphery regions and minimizes the floating of particles that characterize prior art spray heads for brewers. Additionally, the openings 44 provide for a distribution of water over the outer periphery regions of the brew basket and ground coffee at essentially the same volume rate over the surface of the coffee grounds as the openings 42 provide in the central region. This ensures that the extraction rate is uniform at all regions of the ground coffee in the basket. The use of the D-shaped openings at an inclined angle to the horizontal is preferred for the uniform delivery of hot water for equal extraction rates to the peripheral regions. It should be understood, however, that other spray head delivery systems can also accomplish this function. For example, larger spray heads with a larger number of openings could provide a vertical delivery of hot water directly down upon the ground coffee. The larger spray heads, however, would not function as well under the parameter constraints made necessary for the limited quantity of hot water to be delivered. That is, for practical purposes, it is desired that no more than about 48 ounces of hot water is to be used in a typical brewer for a single brewing cycle and that brewing be completed in about 3.5 minutes. The pressure of the water delivered is reduced considerably with the larger type heads, defeating the a important goal of the brewer, namely the rapid dispensing of the coffee beverage in the decanter. Moreover, space within a brewer is severely limited and larger spray heads would certainly test this space limitation.

Figure 9A:
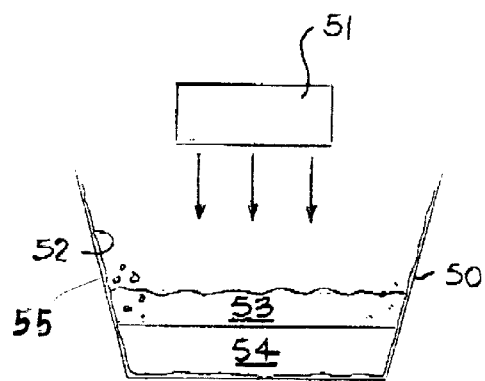
FIG. 9A is a side schematic of a filter basket with coffee grounds positioned therein depicting the "floating" during a brewing cycle using a spray head typical of the prior art.
Figure 9C:
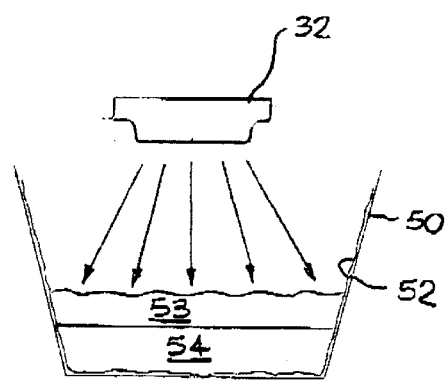
FIG. 9C is a side schematic of a filter basket with coffee grounds positioned therein depicting the more complete wetting that occurs during the brewing cycle using a spray head constructed in accordance with the present invention.
Figure 9B:
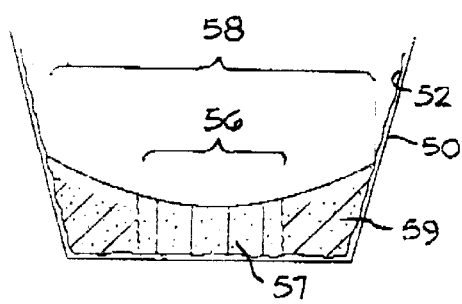
FIG. 9B is a side schematic of a filter basket with coffee grounds positioned therein depicting the under extracted state of grounds near the outside and over extraction of grounds in the center.

The changes in extraction are pictorially represented in FIGS. 9A–9D. Referring first to FIG. 9A, it may be seen that a spray head 51 of the prior art positioned above a filter basket 50 having a filter 52 is delivering hot water to the fresh ground coffee 54 positioned therein during a brewing cycle. Generally, fresh coffee is packaged immediately after being ground to preserve the fresh taste. Gas is caught with the coffee and thus degassing cannot take place prior to the opening of the package to place the grounds into the filter basket. When hot water is delivered to the filter basket, the particles of the ground coffee will tend to float due to the trapped gases and will remain there until "wetted". These particles 55 typically float in the peripheral regions and are the last to be wetted because less hot water is delivered from the spray head. Applicant has determined that this results in inconsistent extraction which can be demonstrated by allowing the grounds to dry after the extraction process. The dried grounds upon examination have color variations between the central region and peripheral region when using the prior art spray heads. This is shown pictorially in FIG. 9B by vertical hatching 57 and cross-hatching 59 in which the central region has a visibly lighter appearance compared to the peripheral region 58 shown by the cross-hatching. The color variation indicates that the central region 56 is likely over extracted while the outer or peripheral region 58 is likely to be under extracted.

Figure 9D:
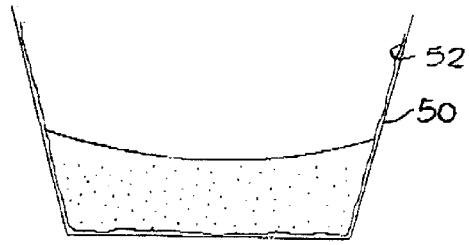
FIG. 9D is a side schematic of a filter basket with coffee grounds positioned therein depicting the more even extraction that occurs when using a spray head constructed in accordance with the present invention.
Figure 10:
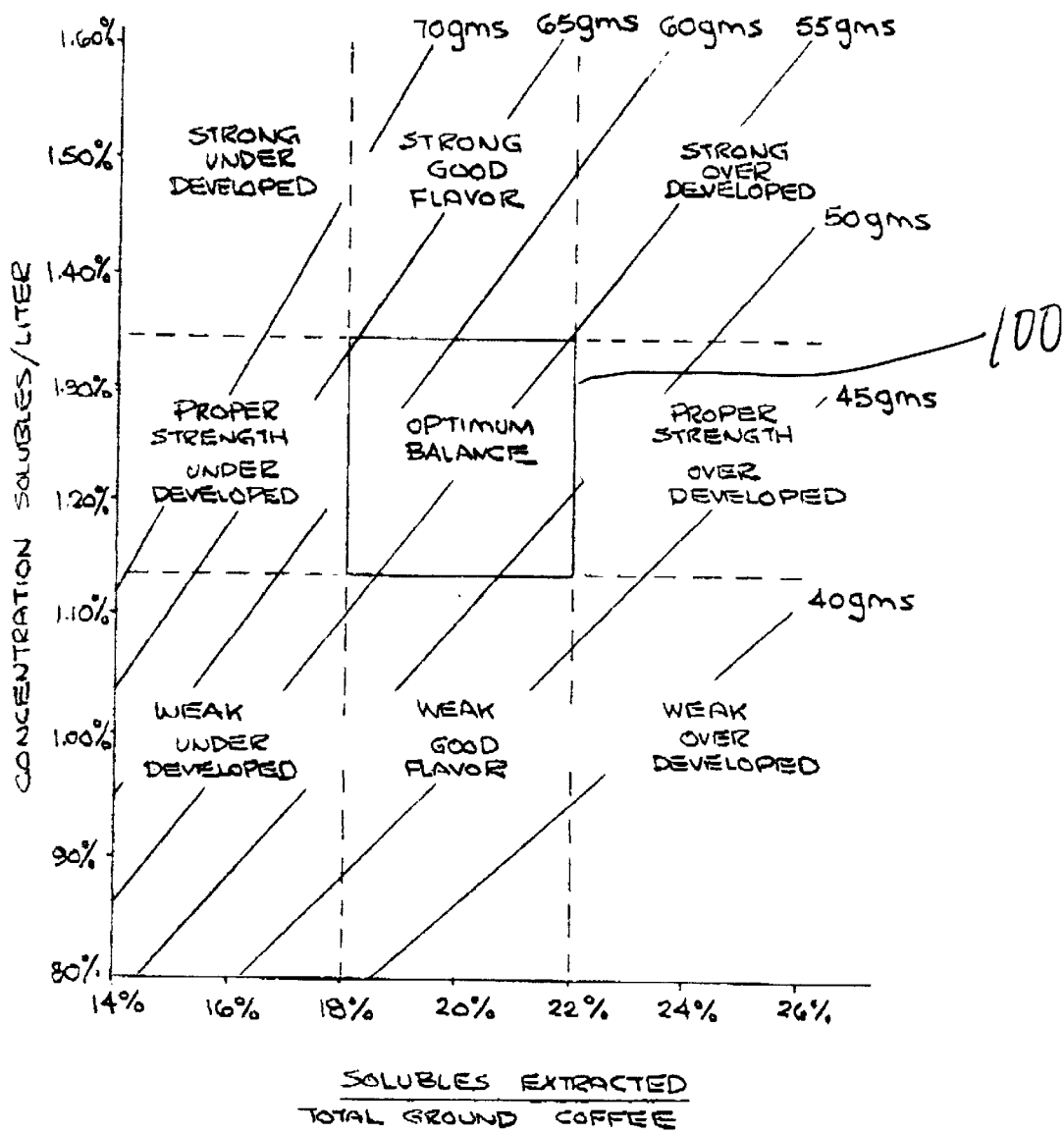
FIG. 10 is a graph depicting the concentration and extraction percentages with the desired balance thereof for a acceptable tasting coffee brew.

In contrast, the spray distribution of the spray head in accordance with applicant's invention delivers hot water over the entire mass of grounds positioned in the brew basket so as to have a more consistent extraction over the entire mass. This is depicted schematically in FIG. 9C where the spray head 32 is distributing hot water over essentially the entire surface of the ground coffee in a uniform manner so that all of the ground coffee 54 positioned in basket 50 and filter 52 is wetted and extracted uniformly. The lack of color variation signifying a more uniform extraction rate is illustrated in FIG. 9D. This provides an opportunity for the hot water to dissolve the solubles throughout the basket as opposed to mainly in the central region. Applicant conducted a series of measurements of coffee brewed with a standard home brewer using a spray head of the prior art and compared the same to coffee brewed in an identical manner except using the spray head in accordance with the present invention. In each series of coffee preparation, two ounces of finely divided ground fresh coffee was placed in the brew basket and sprayed with 48 ounces of hot water at 195° F. A coffee brew hydrometer, a commonly used instrument in the coffee industry that measures extraction percentages, was employed to measure extraction rates for each series. The coffee brewed using the spray head of the prior art had on the average 0.85% extraction rate which results in a perceived under-developed tasting brew because it falls below the desired optimum balance. In contrast the coffee brewed using the spray head of the present invention measured in an identical manner has an extraction rate of about 1.15% and fell into the desired optimum balance area as shown in FIG. 10. This extraction rate was on the average a 35% increase over the extraction rate using the spray head of the prior art. Those who tasted the brewed coffees in each instance judged the second group to have produced a much better tasting beverage.

While the above description describes the spray head of the present invention as being used in a gravity fed type of brewing system, the spray head may be used with any brewing system and provide similar results. Therefore, the invention in accordance with the present invention should be construed in a manner reasonable consistent and within in the spirit of the appended claims.

What is claimed is:

1. A brewing apparatus having a brew basket for holding ingredients in particular form that contain soluble flavorants, a heating tank for heating and holding water, and a hot water delivery system for delivering hot water from said tank to said brew basket, said apparatus including a spray head in liquid communication with said water delivery system and positioned above said brew basket, said spray head having a bottom wall in which a first set of openings is positioned to spray water at predetermined rate over a central surface region of the underlying ingredients and a second set of openings is positioned outside of said first set of openings to spray water at said predetermined rate over a remainder surface region of the underlying ingredients, said bottom wall and each of said second set of openings collectively structured so as to distribute water through said second set of openings in a fan shaped pattern over said remainder region thereby wetting substantially all of the particles of the ingredients and uniformly extracting said solubles.

2. The brewing apparatus of claim 1 in which said spray head has a top plate with an opening for receiving hot water from said hot water delivery system, said bottom wall being a bottom plate abutting said top plate in a water tight relationship along an outer periphery thereof so as to define a centrally positioned cavity with said first and second set of openings being in said bottom plate and within said cavity, said bottom plate having a plurality of channels within said cavity extending from said first opening to said second set of openings with second first openings lying outside of said channels.

3. The apparatus of claim 2 in which said first plurality of openings are defined in the bottom plate in a substantial horizontal plane and said second plurality of openings are defined in said bottom plate at an angle to the horizontal plane and have a D-shaped cross-section.

4. The brewing system of claim 2 wherein said water delivery system delivers water at a rate greater than the rate at which water exits through said second set of openings whereupon said channels overflow and water communicates with said first set of openings thereby distributing water to said central surface region of said grounds.

5. A method of brewing a coffee beverage from ground coffee positioned in a filter basket and delivering the beverage to a decanter comprising the steps of positioning ground coffee in a filter basket over the decanter;

delivering a predetermined amount of hot water to a spray head positioned over the filter basket;

causing the hot water to be distributed at a predetermined volume rate over a central surface region of the underlying ground coffee in the filter basket; and causing the hot water to be distributed and sprayed in a fan shaped pattern at essentially the same predetermined volume rate over an outer periphery surface region of the ground coffee.

6. The method of claim 5 in which the hot water is caused to flow through a plurality of channels to one set of water distribution elements located above the outer periphery surface region of the coffee grounds.

7. The method of claim 6 in which the hot water is distributed by another set of water distribution elements from hot water overflowing out of the plurality of channels.

8. The method of claim 7 in which hot water is delivered at a rate that exceeds the rate of hot water is distributed by said one set of water distribution elements.

9. The method of claim 8 in which said one set of water distribution elements are openings having a D-shaped cross section and are positioned with an axis thereof at an angle to a horizontal plane thereby providing the fan shape pattern.

* * * * *